United States Patent
Huang et al.

(10) Patent No.: US 9,335,827 B2
(45) Date of Patent: May 10, 2016

(54) GESTURE INPUT SYSTEMS AND METHODS USING 2D SENSORS

(71) Applicant: Wistron Corp., New Taipei (TW)

(72) Inventors: Chih-Hao Huang, New Taipei (TW); Hsun-Chih Tsao, New Taipei (TW); Chih-Pin Liao, New Taipei (TW); Pin-Hong Liou, New Taipei (TW)

(73) Assignee: Wistron Corp., New Taipei (TW)

( * ) Notice: Subject to any disclaimer, the term of this patent is extended or adjusted under 35 U.S.C. 154(b) by 90 days.

(21) Appl. No.: 13/900,439

(22) Filed: May 22, 2013

(65) Prior Publication Data

US 2014/0022172 A1    Jan. 23, 2014

(30) Foreign Application Priority Data

Jul. 17, 2012    (TW) .............................. 101125660 A (51) Int. Cl.
| | |
|---|---|
| *G06F 3/01* | (2006.01) |
| *G06F 3/03* | (2006.01) |
| *G06F 3/0482* | (2013.01) |
| *G06F 3/0484* | (2013.01) |
| *G06T 7/00* | (2006.01) |

(52) U.S. Cl.
CPC ................ *G06F 3/017* (2013.01); *G06F 3/011* (2013.01); *G06F 3/0304* (2013.01); *G06F 3/0482* (2013.01); *G06F 3/04842* (2013.01); *G06T 7/0028* (2013.01)

(58) Field of Classification Search
CPC ....... G06F 3/017; G06F 3/011; G06F 3/0488; G06F 3/04883; G06F 3/0346; H04N 7/147; A63F 13/10; A63F 13/06; A63B 24/0003

USPC ......... 345/158; 382/168; 348/14.03; 715/848
See application file for complete search history.

(56) References Cited

U.S. PATENT DOCUMENTS

| | | | | |
|---|---|---|---|---|
| 5,454,043 | A * | 9/1995 | Freeman ....................... | 382/168 |
| 8,181,123 | B2 * | 5/2012 | Stone-Perez et al. ......... | 715/863 |
| 8,325,214 | B2 * | 12/2012 | Hildreth ...................... | 348/14.03 |
| 8,723,789 | B1 * | 5/2014 | Rafii ....................... | G06F 3/011 |
| | | | | 345/156 |
| 9,030,407 | B2 * | 5/2015 | Ronkainen ..................... | 345/156 |
| 2003/0109322 | A1 * | 6/2003 | Funk .................. | A63B 24/0003 |
| | | | | 473/222 |

(Continued)

FOREIGN PATENT DOCUMENTS

| | | |
|---|---|---|
| CN | 101810003 A | 8/2010 |
| CN | 101901052 A | 12/2010 |

(Continued)

OTHER PUBLICATIONS

Taiwan Patent Office, Office Action, Patent Application Serial No. 101125660, Jun. 11, 2014, Taiwan.

(Continued)

*Primary Examiner* — Dwayne Bost
*Assistant Examiner* — Darlene M Ritchie (57) ABSTRACT

A gesture input system with a two-dimension (2D) image sensor and a processing module is provided. The 2D image sensor obtains a plurality of images of a user. The processing module determines positions of an object and a face of the user in a first image of the plurality of images, and determines an operation area for the user according to the positions of the object and the face. Also, the processing module generates a control command according to the subsequent images to the first image of the user within the operation area.

16 Claims, 6 Drawing Sheets

(56) References Cited

U.S. PATENT DOCUMENTS

| | | | |
|---|---|---|---|
| 2003/0138130 A1* | 7/2003 | Cohen et al. | 382/103 |
| 2008/0177497 A1* | 7/2008 | Ohta | A63F 13/10 702/141 |
| 2009/0027337 A1* | 1/2009 | Hildreth | 345/158 |
| 2009/0073117 A1* | 3/2009 | Tsurumi et al. | 345/158 |
| 2009/0079813 A1* | 3/2009 | Hildreth | H04N 7/147 348/14.03 |
| 2009/0201289 A1* | 8/2009 | Kim | G06F 3/0346 345/419 |
| 2009/0217211 A1* | 8/2009 | Hildreth | G06F 3/017 715/863 |
| 2011/0050477 A1* | 3/2011 | Choi | G06F 3/0346 341/176 |
| 2011/0057875 A1 | 3/2011 | Shigeta et al. | |
| 2011/0296353 A1* | 12/2011 | Ahmed et al. | 715/848 |
| 2012/0204133 A1* | 8/2012 | Guendelman | G06F 3/017 715/863 |
| 2012/0309536 A1* | 12/2012 | Langridge | G06F 3/017 463/39 |
| 2013/0283213 A1* | 10/2013 | Guendelman et al. | 715/848 |

FOREIGN PATENT DOCUMENTS

| | | |
|---|---|---|
| TW | 200928892 A | 7/2009 |
| TW | M363746 | 8/2009 |

OTHER PUBLICATIONS

China Patent Office, Office Action, Patent Application Serial No. 201210272879.6, Nov. 30, 2015, China.

* cited by examiner

GESTURE INPUT SYSTEMS AND METHODS USING 2D SENSORS

CROSS REFERENCE TO RELATED APPLICATIONS

This application claims priority of Taiwan Patent Application No. 101125660, filed on Jul. 17, 2012, the entirety of which is incorporated by reference herein.

BACKGROUND

1. Field Disclosure

The disclosure generally relates to the design of user interfaces, and more particularly, to gesture input systems and methods for providing a configurable operation area in which remote control may be achieved by users' gestures.

2. Description of the Related Art

In the User Interface (UI) field, most designs are developed based upon the widespread use of computers or consumer electronic products, such as smart phones, panel Personal Computers (PC), notebook PCs, and multimedia players, etc. The Graphic User Interface (GUI) is one of the most common designs of a UI, which is usually provided on a display device and is operated by moving a mouse cursor and/or clicking a mouse button to implement control options, such as "select" and "execute".

However, with rapid developments in computer technology, users no longer want to be confined to the control limits inherent with using a mouse and keyboard, and wish to have more flexible choices when operating devices, such as computers or consumer electronic products. To this end, the so-called perceptual UIs have been developed, including touch controls and gesture controls. Despite the operational characteristics of perceptual UIs are different from conventional UIs, when using perceptual UIs, users contradictorily wish to have the mouse and keyboard characteristic, while also having the flexibility provided by the perceptual UIs.

Among the perceptual UIs, the two-dimension (2D) gesture recognition technique is well known for its operational convenience and low cost. However, without the depth information (or called Z-axis information), the 2D gesture recognition technique is restricted to provide only cursor-like operations and cannot provide more complicated operations, such as clicking and dragging. These restrictions may be alleviated by the 3D gesture recognition technique (used by Kinect by Microsoft®), but it does have several drawbacks, such as a high cost, complicated mechanical structures, etc., which decreases practical application.

Thus, it is desirable to have a gesture input method for using 2D images of users to provide a configurable operation area in which remote control may be achieved by users' gestures.

BRIEF SUMMARY OF THE DISCLOSURE

In one aspect of the disclosure, a gesture input system comprising a 2D image sensor and a processing module is provided. The 2D image sensor obtains a plurality of images of a user. The processing module determines positions of an object and a face of the user in a first image of the plurality of images, and determines an operation area for the user according to the positions of the object and the face. Also, the processing module generates a control command according to the subsequent images to the first image of the user within the operation area.

In another aspect of the disclosure, a gesture input method is provided. The gesture input method comprises the steps of obtaining a plurality of images of a user via a 2D image sensor, determining positions of an object and a face of the user in a first image of the plurality of images, determining an operation area for the user according to the positions of the object and the face, and generating a control command according to the subsequent images to the first image of the user within the operation area.

Other aspects and features of the disclosure will become apparent to those with ordinary skill in the art upon review of the following descriptions of specific embodiments of the gesture input systems and methods.

BRIEF DESCRIPTION OF DRAWINGS

The disclosure can be more fully understood by reading the subsequent detailed description and examples with references made to the accompanying drawings, wherein.

DETAILED DESCRIPTION OF THE DISCLOSURE

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
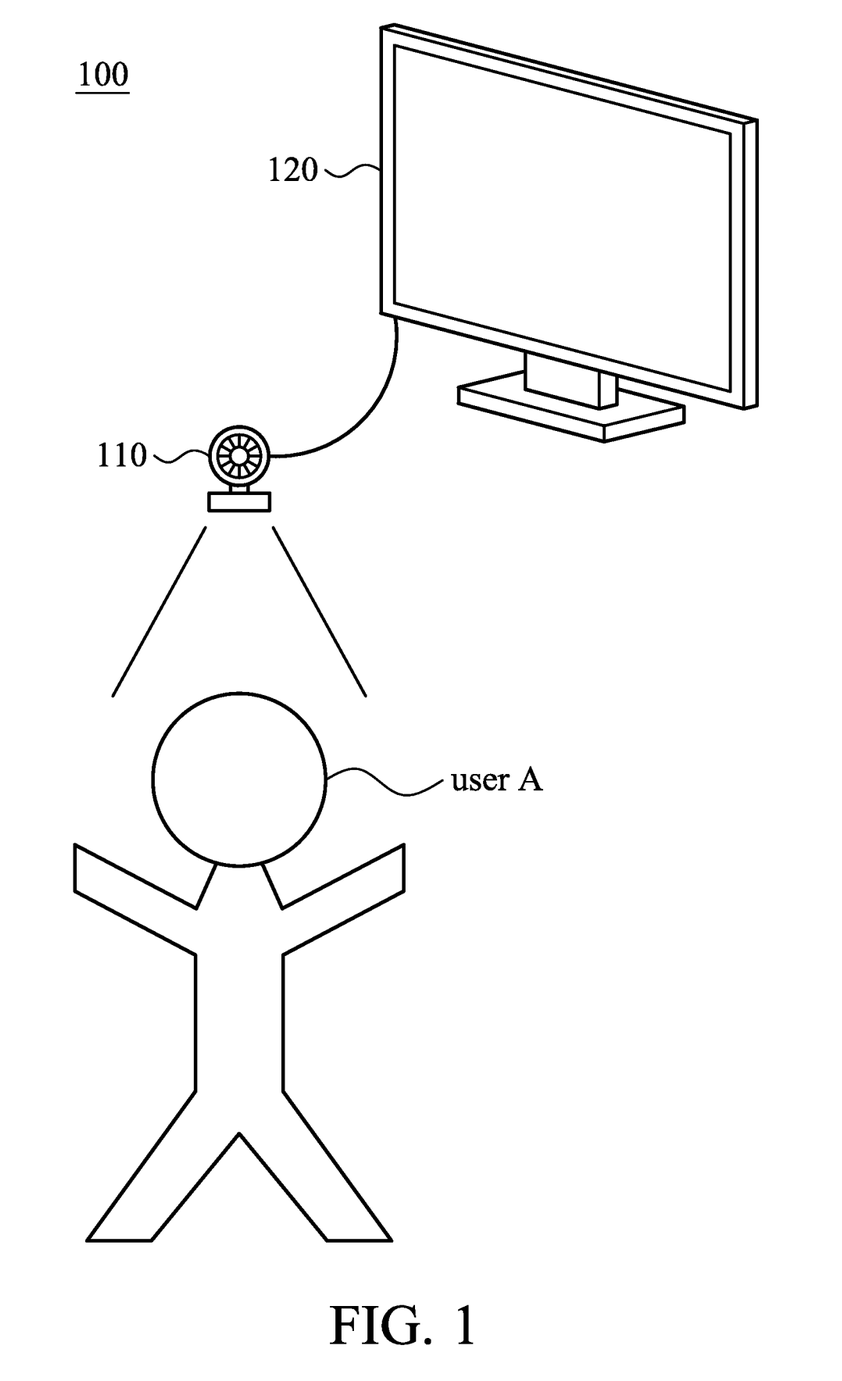
FIG. 1 is a block diagram illustrating a gesture input system according to an embodiment of the disclosure.

FIG. 1 is a block diagram illustrating a gesture input system according to an embodiment of the disclosure. In the gesture input system 100, the image sensor 110 is a 2D camera which obtains 2D images of the user and transmits the 2D images to the multimedia electronic device 120 for the multimedia electronic device 120 to analyze and determine the user's gesture input. The multimedia electronic device 120 may be an All-In-One (AIO) computer, a panel PC, a notebook PC, a desktop PC, or a smart TV, etc. The image sensor 110 may be disposed near the multimedia electronic device 120, e.g., under or on top of the multimedia electronic device 120, or next to the multimedia electronic device 120. In other embodiments, the image sensor 110 and the multimedia electronic device 120 may be incorporated into a single device. For example, the image sensor 110 may be a built-in component in the multimedia electronic device 120, and the disclosure is not limited thereto.

Figure 2:
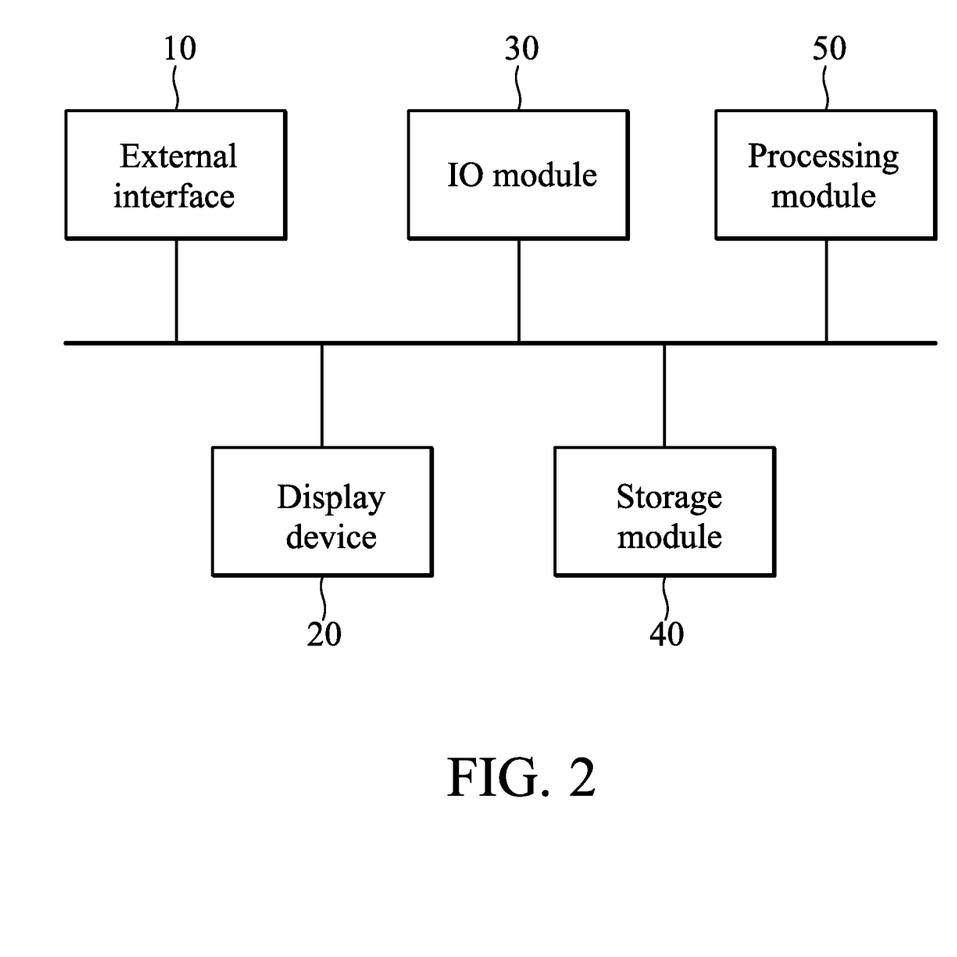
FIG. 2 is a block diagram illustrating the multimedia electronic device 120 according to an embodiment of the disclosure.

FIG. 2 is a block diagram illustrating the multimedia electronic device 120 according to an embodiment of the disclosure. The multimedia electronic device 120 may comprise an external interface 10, a display device 20, an Input/Output (IO) module 30, a storage module 40, and a processing module 50. The external interface 10 is configured to provide a wired a wireless connection to the image sensor 110 for receiving a plurality of images of the user. The display device 20 may be an electronic light or flash, a Cathode Ray Tube (CRT) screen, a Liquid Crystal Display (LCD), a Plasma display/panel, or any device with display functionality. The IO module 30 may comprise built-in or external components, such as a microphone, speaker, keyboard, mouse, and touch pad, etc. The storage module 40 may be a volatile memory, e.g., Random Access Memory (RAM), or non-volatile memory, e.g., FLASH memory, or hardware, compact disc, or any combination of the above media. The processing module 50 may be a general purpose processor or a Micro Control Unit (MCU) which is responsible for executing machine-readable instructions to control the operations of the external interface 10, the display device 20, the IO module 30, and the storage module 40, and to perform the gesture input method of the disclosure. For example, the gesture input method of the disclosure may be implemented as a software product which may be stored in the storage module 40 and later be loaded and executed by the processing module 50.

Note that, in another embodiment, the multimedia electronic device 120 may be further connected to other electronic devices, such as air conditioners, refrigerators, electric fans, computers, and televisions, etc., via the external interface 10, and the multimedia electronic device 120 may transform user's gesture inputs into control commands and forward the control commands to the electronic devices for controlling them remotely. Therefore, the disclosure is not limited to the embodiment of FIG. 1.

Figure 3A:
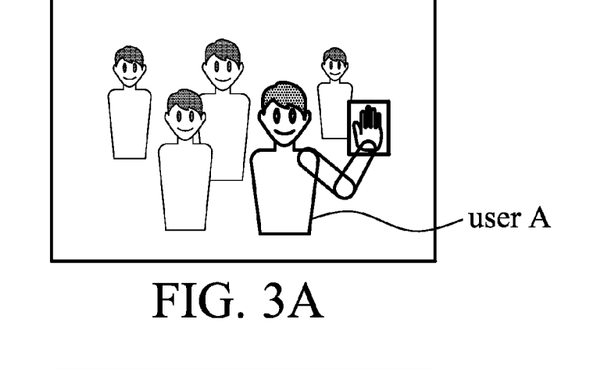
FIGS. 3A to 3D are schematic diagrams illustrating the operations of the gesture input system according to an embodiment of the disclosure.

FIGS. 3A to 3D are schematic diagrams illustrating the operations of the gesture input system according to an embodiment of the disclosure. The schematic diagrams show the images obtained by the image sensor 110, i.e., the mirror images of the actual view in front of the image sensor 110. At first, as shown in FIG. 3A, there are several users in front of the image sensor 110, wherein user A raises his/her left hand when he/she wants to input gestures. The multimedia electronic device 120 performs palm detection on the image to determine the position of the palm of user A. To further clarify, in order to improve the efficiency of palm detection, user A may wave his/her palm, and the multimedia electronic device 120 may perform a motion detection on the entire image to determine the area where the movement of the object is detected and then perform the palm detection on the image within the located area. In this embodiment, the multimedia electronic device 120 first analyzes the image to determine the palm area, and then uses the center of the palm area to represent the position of the palm of user A, but the disclosure is not limited thereto. For example, any point within the palm area may be used to represent the position of the palm of user A.

In other embodiments, user A may use another object (e.g., a stick) to replace the palm, or use another gesture (e.g., the victory gesture, or first) instead of the open palm. That is, the multimedia electronic device 120 may detect any particular form of the object or gesture to determine the position of the object or gesture.

Figure 3B:
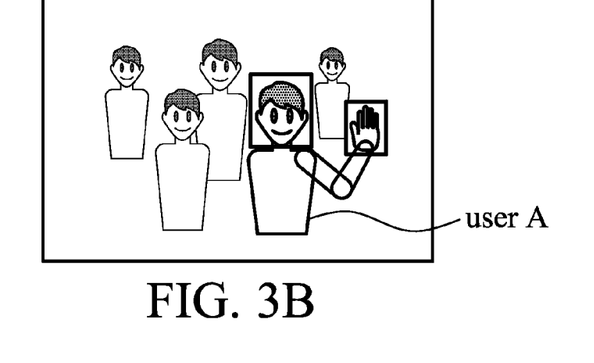

As shown in FIG. 3B, the multimedia electronic device 120 performs face detection on the image to locate the face around the position of the palm, and pairs up the face with the palm, thereby determining the position of the face of user A in the image. In this embodiment, the multimedia electronic device 120 first analyzes the image to determine the face area, and then uses the center of the face area to represent the position of the face of user A, but the disclosure is not limited thereto. For example, any point in the face area may be used to represent the position of the face of user A.

Note that, in another embodiment, the step of face detection as shown in FIG. 3B may be performed prior to the step of palm detection as shown in FIG. 3A. That is, the multimedia electronic device 120 may first determine the position of the face of user A, and then locate the palm around the position of the face for pairing them up.

Figure 3C:
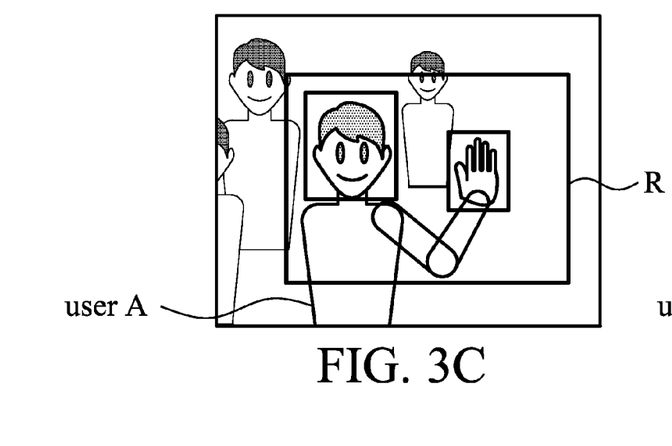

As shown in FIG. 3C, the multimedia electronic device 120 determines the operation area R for user A according to the positions of the palm and the face. In this embodiment, the length and width of the operation area R are determined using the distance between the positions of the palm and the face as a parameter. Alternatively, in another embodiment, the operation area R may be determined by specifying the positions of the palm and the face as boundaries of the operation area R.

In addition, the multimedia electronic device 120 may periodically repeat the determination of the positions of the palm and the face as shown in FIGS. 3A and 3B to update the operation area R. Alternatively, the multimedia electronic device 120 may calculate the average moving range in which the palm moves in the operation area R according to subsequent images obtained by the image sensor 110, and periodically update the operation area R according to the average moving range.

Note that, although the operation area R in FIG. 3C is shown to be a rectangular area, another shape of area, e.g., a circular area, or a diamond area, may be used instead to define the operation area R.

Figure 3D:
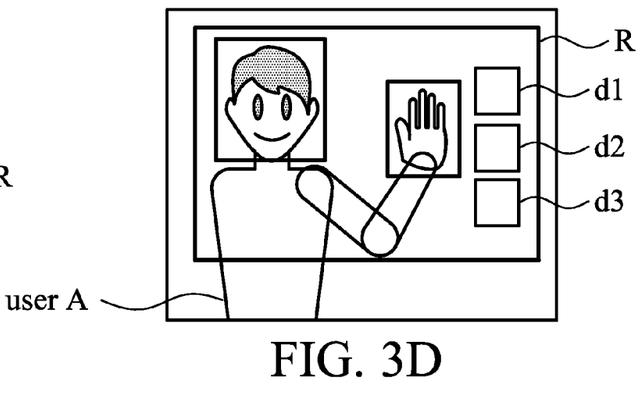

Subsequently, as shown in FIG. 3D, the multimedia electronic device 120 determines the trigger areas d1 to d3 in the operation area R. In one embodiment, the multimedia electronic device 120 may directly take specific areas in the operation area R to be the trigger areas d1 to d3. In another embodiment, the multimedia electronic device 120 may perform mapping of the operation area R to a UI to determine the trigger areas d1 to d3, wherein the UI may be a GUI displayed on the display device 20 or an interface provided by electric lights/flashes.

Figure 4:
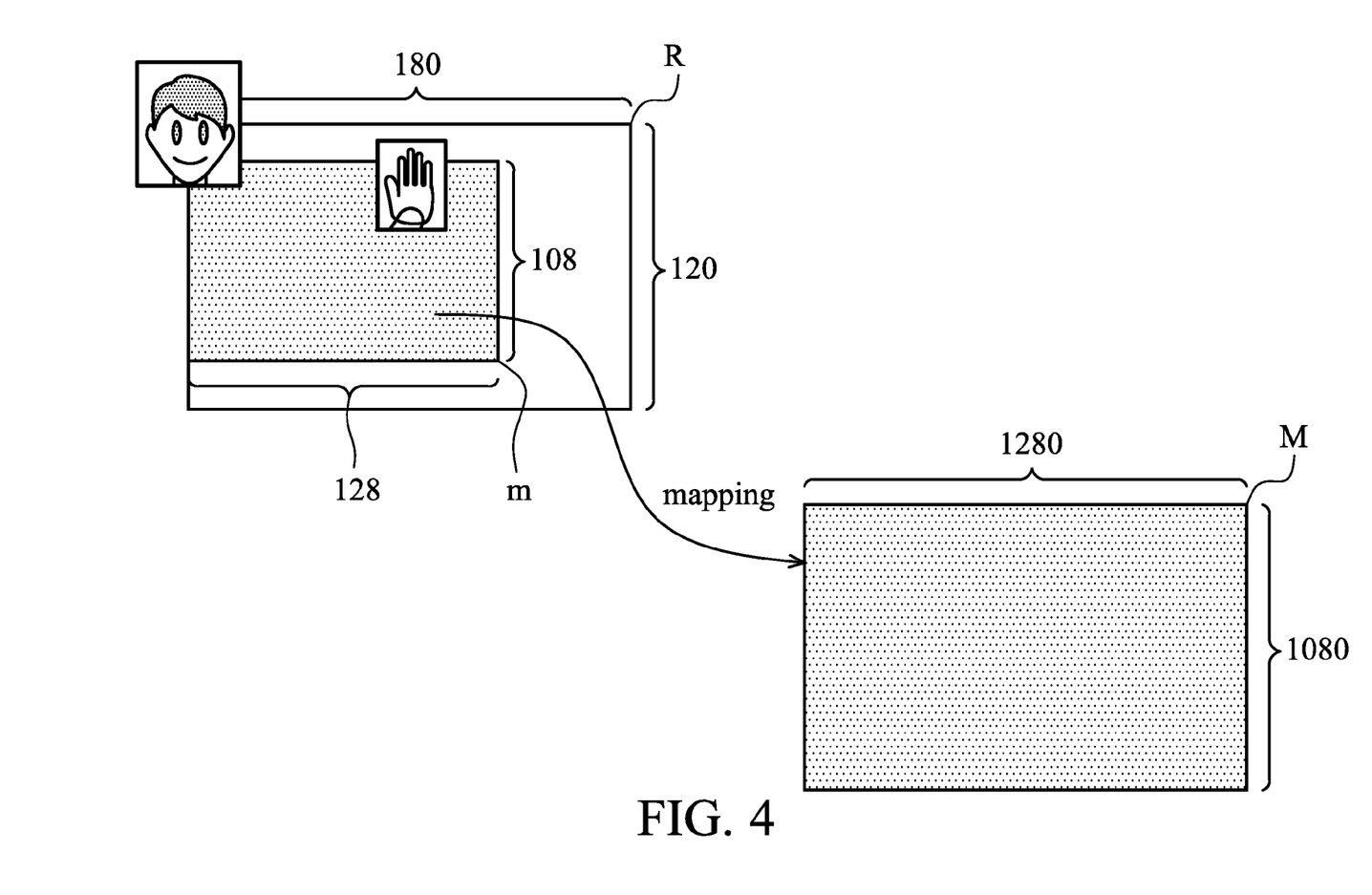
FIG. 4 is a schematic diagram illustrating the mapping of the operation area to a UI according to an embodiment of the disclosure.

FIG. 4 is a schematic diagram illustrating the mapping of the operation area to a UI according to an embodiment of the disclosure. The upper left corner of the operation area R is positioned at the center of the face area, and the operation area R is determined to be a rectangular shape of 180 by 120 pixels by using the distance between the positions of the palm and the face as a parameter. The UI which the operation area R is mapped to is a rectangular GUI M of 1280 by 1080 pixels. The multimedia electronic device 120 may first determine a mapping area m of 128 by 120 pixels in the operation area R according to the aspect ratio of the GUI M. In addition, the rest of the operation area R other than the mapping area m may be used as a buffering area. Lastly, the coordinates of the mapping area m are mapped to those of the GUI M. After that, the trigger areas d1 to d3 may respectively correspond to the shortcut icons of specific applications in the GUI M.

Subsequent to the determinations of the operation area R and the trigger areas d1 to d3, the multimedia electronic device 120 may generate a control command according to the contact relation between the positions of the palm in the subsequent images and the trigger areas d1 to d3.

For example, assuming that the trigger areas d1 to d3 correspond to the shortcut icons of the applications APP1 to APP3 in the GUI M, a control command 1 for executing the application APP1 is generated when the positions of the palm of user A contact the trigger area d1. A control command 2 for executing the application APP2 is generated when the positions of the palm of user A contact the trigger area d2. Similarly, a control command 3 for executing the application APP3 is generated when the positions of the palm of user A contact the trigger area d3.

Alternatively, in another embodiment, the multimedia electronic device 120 may determine only one trigger area within the operation area R, and then specify a plurality of types of the contact relation between the positions of the palm in the subsequent images and the trigger areas d1 to d3. Thus, different control commands may be generated according to the types of the contact relation. For example, a control command 1' for "channel up" is generated when the palm of user A moves from the outside of the trigger area to the inside of the trigger area. A control command 2' for "channel down" is generated when the palm of user A moves from the inside of the trigger area to the outside of the trigger area. A control command 3' for "volume up" is generated when the palm of user A moves from the outside of the trigger area to the inside of the trigger area through a side of the trigger area, and then moves from the inside of the trigger area back to the outside of the trigger area through the side of the trigger area (including moving in and out for once or several times). A control command 4' for "volume down" is generated when the palm of user A moves from the inside of the trigger area to the outside of the trigger area through a side of the trigger area, and then moves back to the inside of the trigger area through the side of the trigger area (including moving out and in for once or several times).

In other embodiments, the multiple trigger areas may be further incorporated with the types of the contact relation to generate other control commands or even high-level control commands, and the disclosure is not limited thereto.

Figure 5:
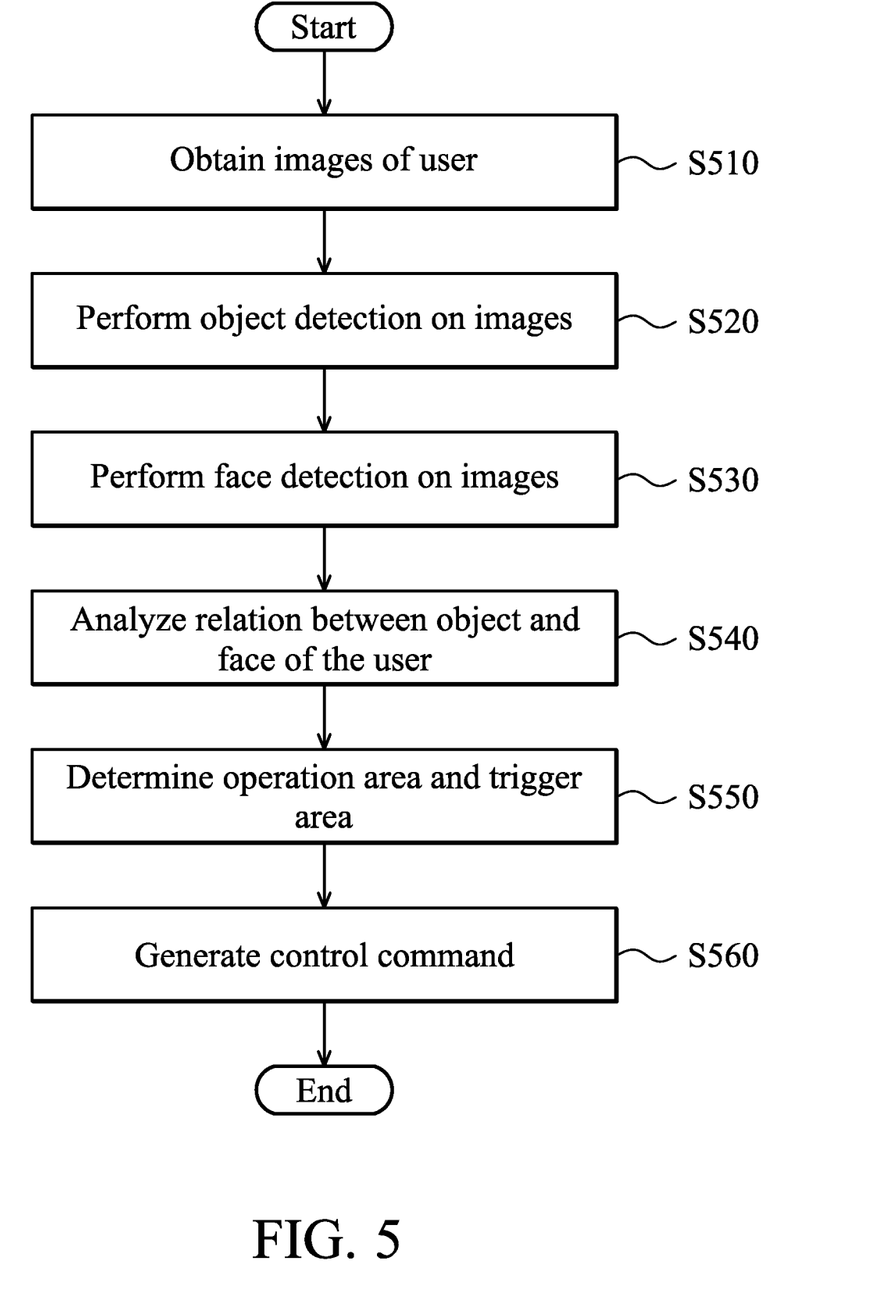
FIG. 5 is a flow chart illustrating the gesture input method according to an embodiment of the disclosure.

FIG. 5 is a flow chart illustrating the gesture input method according to an embodiment of the disclosure. To begin, a plurality of images of a user is obtained via a 2D image sensor (step S510), and then the positions of an object and a face of the user are determined in a first image of the plurality of images (step S520). Next, a face detection is performed on the first image to determine an operation area for the user according to the positions of the object and the face (step S530). Specifically, the object may be the palm of the user, or an object which the user is holding in his/her hand(s). Subsequently, the relation between the object and the face of the user is analyzed (step S540). To further clarify, the relation may be the relation to their sizes or the distance therebetween. After that, the operation area and the trigger area within the operation area is determined according to the relation between the object and the face of the user (step S550), and then the control command is generated according to the contact relation between the positions of the object in the subsequent images and the trigger area (step S560).

Figure 6:
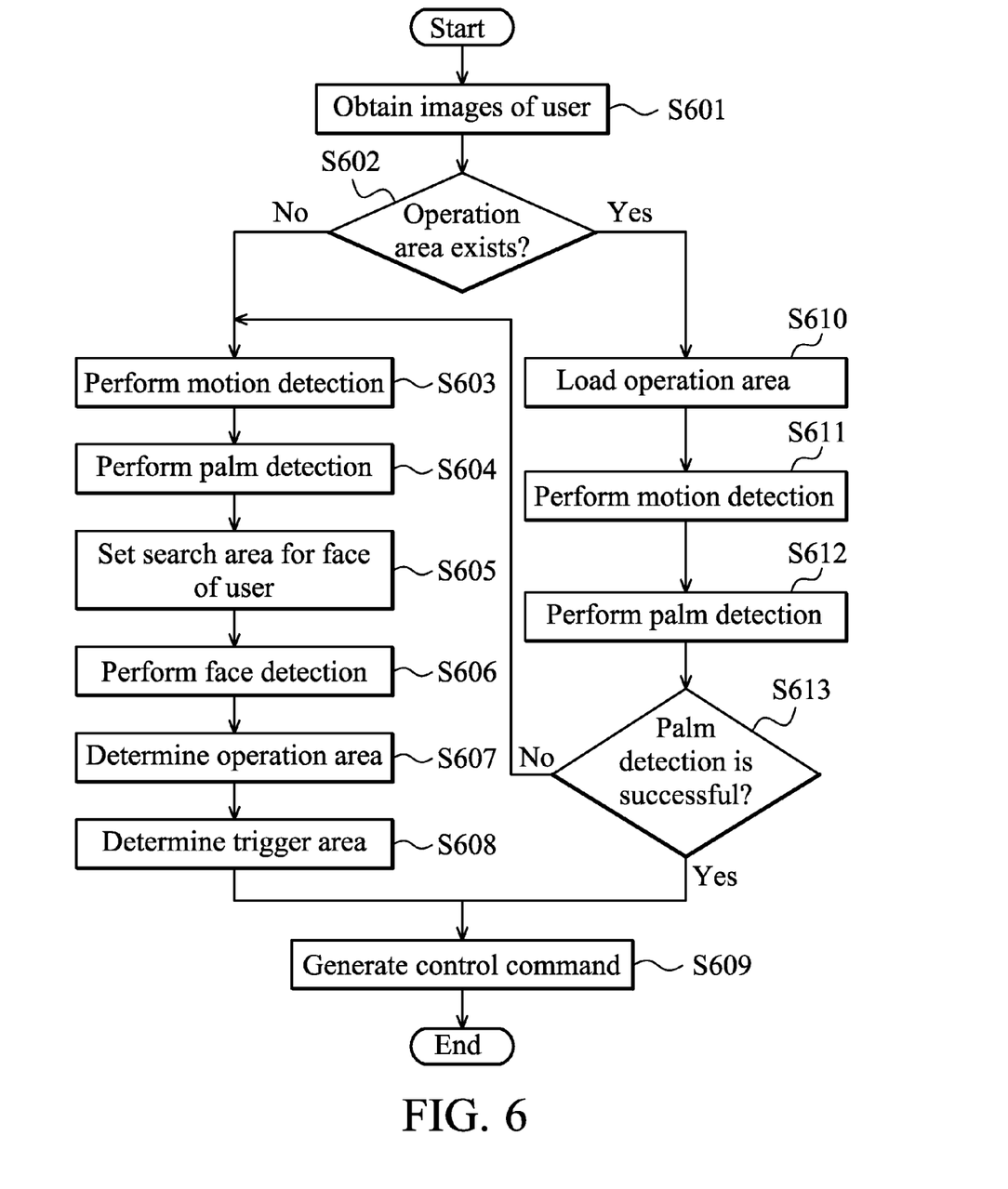
FIG. 6 is a flow chart illustrating the gesture input method according to another embodiment of the disclosure.

FIG. 6 is a flow chart illustrating the gesture input method according to another embodiment of the disclosure. To begin, a plurality of images of a user is obtained via a 2D image sensor (step S601), and then it is determined whether an operation area exists for the gesture input method (step S602). If no operation area exists, a motion detection is performed on the entire images to determine the area where movement of the object is detected (step S603), and then a palm detection is performed on the images within the located area to determine the position of the palm of the user (step S604). Next, the search area for the face of the user is set to be near to the position of the palm (step S605), and a face detection is performed on the image within the search area to determine the position of the face of the user (step S606). For example, if the user is a left-handed person, then the search area may be set to be on the left side of the position of the palm. Otherwise, if the user is a right-handed person, the search area may be set to be on the right side of the position of the palm. After that, an operation area for the user is determined according to the positions of the palm and the face in the first image (step S607), and then a trigger area within the operation area is determined (step S608). Accordingly, a control command is determined according to the contact relation between the positions of the palm in the subsequent images and the trigger area (step S609).

Subsequent to step S602, if an operation area exists, the operation area is loaded (step S610), and subsequent processing only focuses on the images within the operation area to reduce the amount of processed image data. Similar to step S603 and S604, a motion detection is performed on the images within the operation area to determine the area where movement of the object is detected (step S611), and then a palm detection is performed on the images within the located area to determine the position of the palm of the user (step S612). Next, it is determined whether the palm detection is successful (step S613), and if so, step S609 is performed to generate a control command. Otherwise, if the palm detection fails, it means that no palm has been detected within the operation area for a certain period of time, and thus, steps S603 to S607 are performed to update the operation area. In one embodiment, the detected positions of the palm may be recorded during step S604, and later in step S613, if no palm is detected, the search area for the palm may be reset according to the recorded positions of the palm to repeat steps S603 to S607.

While the disclosure has been described by way of example and in terms of preferred embodiment, it is to be understood that the disclosure is not limited thereto. Those who are skilled in this technology can still make various alterations and modifications without departing from the scope and spirit of this disclosure. Therefore, the scope of the disclosure shall be defined and protected by the following claims and their equivalents.

What is claimed is:

1. A gesture input system, comprising:
    a two-dimension (2D) image sensor, obtaining a plurality of images of a user; and
    a processing module, determining positions of an object and a face of the user in a first image of the plurality of images, determining an operation area for the user according to the positions of the object and the face in a 2D plane corresponding to the plurality of images, determining a trigger area within the operation area and in the 2D plane, determining a first contact relation between positions of the object in the subsequent images and the trigger area in the 2D plane, and generating a first control command according to the first contact relation,
    wherein the first contact relation is one of a plurality of predetermined types of first contact relations comprising:
        the object moves from the outside of the trigger area to the inside of the trigger area through a side of the trigger area in the 2D plane, and then moves from the inside of the trigger area to the outside of the trigger area through the side of the trigger area in the 2D plane; and
        the object moves from the inside of the trigger area to the outside of the trigger area through a side of the trigger area in the 2D plane, and then moves to the inside of the trigger area through the side of the trigger area in the 2D plane.

2. The gesture input system of claim 1, wherein the processing module further performs mapping of the operation area to a user interface for determining the trigger area.

3. The gesture input system of claim 1, wherein the processing module further determining a second contact relation between positions of the object in the subsequent images and the trigger area in the 2D plane, and generating a second control command according to the second contact relation, wherein the second contact relation is one of a plurality of predetermined types of second contact relations comprising:
the object moves from the outside of the trigger area to the inside of the trigger area in the 2D plane; and
the object moves from the inside of the trigger area to the outside of the trigger area in the 2D plane.

4. The gesture input system of claim 1, wherein the operation area is determined by specifying the positions of the object and the face as boundaries of the operation area, or by a distance between the positions of the object and the face.

5. The gesture input system of claim 1, wherein the processing module further repeats the determination of the positions of the object and the face periodically to update the operation area.

6. The gesture input system of claim 1, wherein the processing module further determines an average moving range in which the object has moved within the operation area according to positions of the object in the subsequent images, and periodically updates the operation area according to the average moving range.

7. The gesture input system of claim 1, wherein the processing module further detects a movement of the object via the 2D image sensor for determining the position of the object, and searching for where the face of the user is around the object for determining the position of the face.

8. The gesture input system of claim 1, wherein each of the plurality of predetermined types of first contact relations corresponds to a single first control command.

9. A gesture input method, comprising:
obtaining a plurality of images of a user via a two-dimension (2D) image sensor;
determining positions of an object and a face of the user in a 2D plane in a first image of the plurality of images;
determining an operation area for the user in the 2D plane according to the positions of the object and the face;
determining a trigger area within the operation area and in the 2D plane;
determining a first contact relation between positions of the object in the subsequent images and the trigger area in the 2D plane; and
generating a first control command according to the contact relation,
wherein the first contact relation is one of a plurality of predetermined types of first contact relations comprising:
the object moves from the outside of the trigger area to the inside of the trigger area through a side of the trigger area in the 2D plane, and then moves from the inside of the trigger area to the outside of the trigger area through the side of the trigger area in the 2D plane; and
the object moves from the inside of the trigger area to the outside of the trigger area through a side of the trigger area in the 2D plane, and then moves to the inside of the trigger area through the side of the trigger area in the 2D plane.

10. The gesture input method of claim 9, wherein the step of determining the trigger area further comprises mapping the operation area to a user interface.

11. The gesture input method of claim 9, further comprising the steps of:
determining a second contact relation between positions of the object in the subsequent images and the trigger area in the 2D plane; and
generating a second control command according to the contact relation, wherein the second contact relation is one of a plurality of predetermined types of second contact relations comprising:
the object moves from the outside of the trigger area to the inside of the trigger area in the 2D plane;
the object moves from the inside of the trigger area to the outside of the trigger area in the 2D plane.

12. The gesture input method of claim 9, wherein the operation area is determined by specifying the positions of the object and the face as boundaries of the operation area, or by a distance between the positions of the object and the face.

13. The gesture input method of claim 9, further comprising repeating the determination of the positions of the object and the face periodically to update the operation area.

14. The gesture input method of claim 9, further comprising:
determining an average moving range in which the object has moved within the operation area according to positions of the object in the subsequent images; and
periodically updating the operation area according to the average moving range.

15. The gesture input method of claim 9, wherein the step of determining the positions of the object and the face further comprises:
detecting a movement of the object via the 2D image sensor for determining the position of the object; and
searching for where the face of the user is around the object for determining the position of the face.

16. The gesture input method of claim 9, wherein each of the plurality of predetermined types of first contact relations corresponds to a single first control command.

* * * * *